United States Patent

Iida et al.

[11] Patent Number: 5,722,237
[45] Date of Patent: Mar. 3, 1998

[54] MUFFLER STRUCTURE FOR INTERNAL COMBUSTION ENGINE

[75] Inventors: Giichi Iida; Yasuharu Sato; Kengo Kubo, all of Tokyo, Japan

[73] Assignee: Kioritz Corporation, Tokyo, Japan

[21] Appl. No.: 733,299

[22] Filed: Oct. 17, 1996

[30] Foreign Application Priority Data

Oct. 20, 1995 [JP] Japan .................. 7-272959

[51] Int. Cl.⁶ .................. F01N 3/28; F01N 7/18
[52] U.S. Cl. .................. 60/302; 60/299; 181/240; 181/258
[58] Field of Search .................. 60/299, 302; 181/240, 181/258

[56] References Cited

U.S. PATENT DOCUMENTS 4,142,607  3/1979  Landwehr et al. .................. 181/259
5,139,107  8/1992  Nagai .................. 181/240
5,373,119  12/1994  Suzuki et al. .................. 60/299 X
5,651,249  7/1997  Nagao et al. .................. 60/299 X

*Primary Examiner*—Tony M. Argenbright
*Attorney, Agent, or Firm*—Baker & Botts, L.L.P.

[57] ABSTRACT

A muffler structure for an internal combustion engine is disclosed which is capable of diminishing occurrence of fraying and lowering of exhaust gas cleaning performance and durability, and which enables replacement of the catalytic cloth and the like to readily be carried out. The muffler structure for an internal combustion engine comprises a muffler 10 and a catalytic assembly 30 disposed in the muffler 10, the catalytic assembly 30 including a spark arresting wire mesh 32 and a catalytic cloth 37 fitted over the spark arresting wire mesh 32, the catalytic cloth 37 has its peripheral edge 37a covered entirely or in substantial part and retained with side walls 34, 34, 36 peripherally provided on the spark arresting wire mesh 32.

4 Claims, 4 Drawing Sheets

MUFFLER STRUCTURE FOR INTERNAL COMBUSTION ENGINE

BACKGROUND OF THE INVENTION

1. Field of the Invention

The present invention relates to muffler structures for internal combustion engines such as a small air-cooled two-cycle gasoline engine which is preferably used in a portable small-sized working machine such as a brush cutter or a chain saw. In particular, it relates to those having a catalytic member for cleaning exhaust gas incorporated therein.

2. Description of the Prior Art

Recently, even in a small-sized internal combustion engine such as an air-cooled two-cycle gasoline engine which is used in a portable working machine such as a brush cutter or a chain saw, it has strongly been desired to depollute exhaust gas discharged therefrom by reducing HC, CO and the like contained in the exhaust gas.

To comply therewith, it had been proposed to place a catalytic member for cleaning exhaust gas in a muffler (see, for example, Japanese Unexamined Utility Model Publication No.92517/1991). More specifically, that proposed a muffler structure for an internal combustion engine, which comprises an exhaust gas introducing pipe and a cylindrical member fitted over the exhaust gas introducing pipe, the cylindrical member including supporting nettings and a catalytic cloth held therebetween, the catalytic cloth including a cloth matrix and a catalyst deposited thereon.

However, in such a conventional muffler structure for an internal combustion engine, the catalytic member is a textile one and hence susceptible to fraying at its peripheral edge (cut end) due to pressure and pulse of the exhaust gas to lead to release of the catalyst. This results in lowering of exhaust gas cleaning performance and durability of the catalytic member. Further, the catalytic member is disposed in the vicinity of an exhaust port of the engine where a temperature is so high. This also impairs the exhaust gas cleaning performance and durability of the catalytic member. Due to the above difficulty, it is required to frequently replace the catalytic member and other parts, leading to increased maintenance cost. Further, there is a problem that the replacement operation is cumbersome because it is necessary for the replacement of the catalytic member to remove and attach many parts.

SUMMARY OF THE INVENTION

The present invention has been made in view of these problems. It is, therefore, an object of the present invention to provide a muffler structure for an internal combustion engine, which is capable of diminishing occurrence of fraying and lowering of exhaust gas cleaning performance and durability, and which enables replacement of the catalytic cloth and the like to readily be carried out.

To attain the above object, the muffler structure for an internal combustion engine according to the present invention comprises:

a muffler, and a catalytic assembly disposed in the muffler, the catalytic assembly including a spark arresting wire mesh and a catalytic cloth fitted over the spark arresting wire mesh, the catalytic cloth has its peripheral edge covered entirely or in substantial part and retained with side walls peripherally provided on the wire mesh.

As preferred embodiments, there may be mentioned one wherein the catalytic assembly is substantially U- or truncated V-shaped in section and placed in such a condition that its opening end adjoins an outlet opening of the muffler, and one wherein the catalytic assembly is adapted to be capable of being passed through the outlet opening of the muffler.

According to the muffler structure for an internal combustion engine of the present invention which is constructed as described above, the peripheral edge of the catalytic cloth is protected by the side walls provided on the spark arresting wire mesh, thereby diminishing occurrence of fraying and lowering of exhaust gas cleaning performance and durability.

It is to be noted that as means for retaining the catalytic cloth and for preventing fraying, the spark arresting wire mesh is utilized which is prepared only by providing a spark arresting wire mesh of a type customarily employed in a muffler with side walls, and no other member is required therefor. This is economically advantageous.

Further, the catalytic assembly is located in the vicinity of the outlet opening where a temperature is relatively low in the muffler, thereby further retarding lowering of exhaust gas cleaning performance and durability. Moreover, since the catalytic assembly is adapted to be capable of being passed through the outlet opening of the muffler by utilizing the elastic deflection, attachment/ detachment of the catalytic assembly can be performed from the outside of the muffler. Accordingly, replacement of the catalytic cloth can readily be carried out, thereby realizing minimized maintenance cost.

DESCRIPTION OF THE PREFERRED EMBODIMENT

Figure 1:
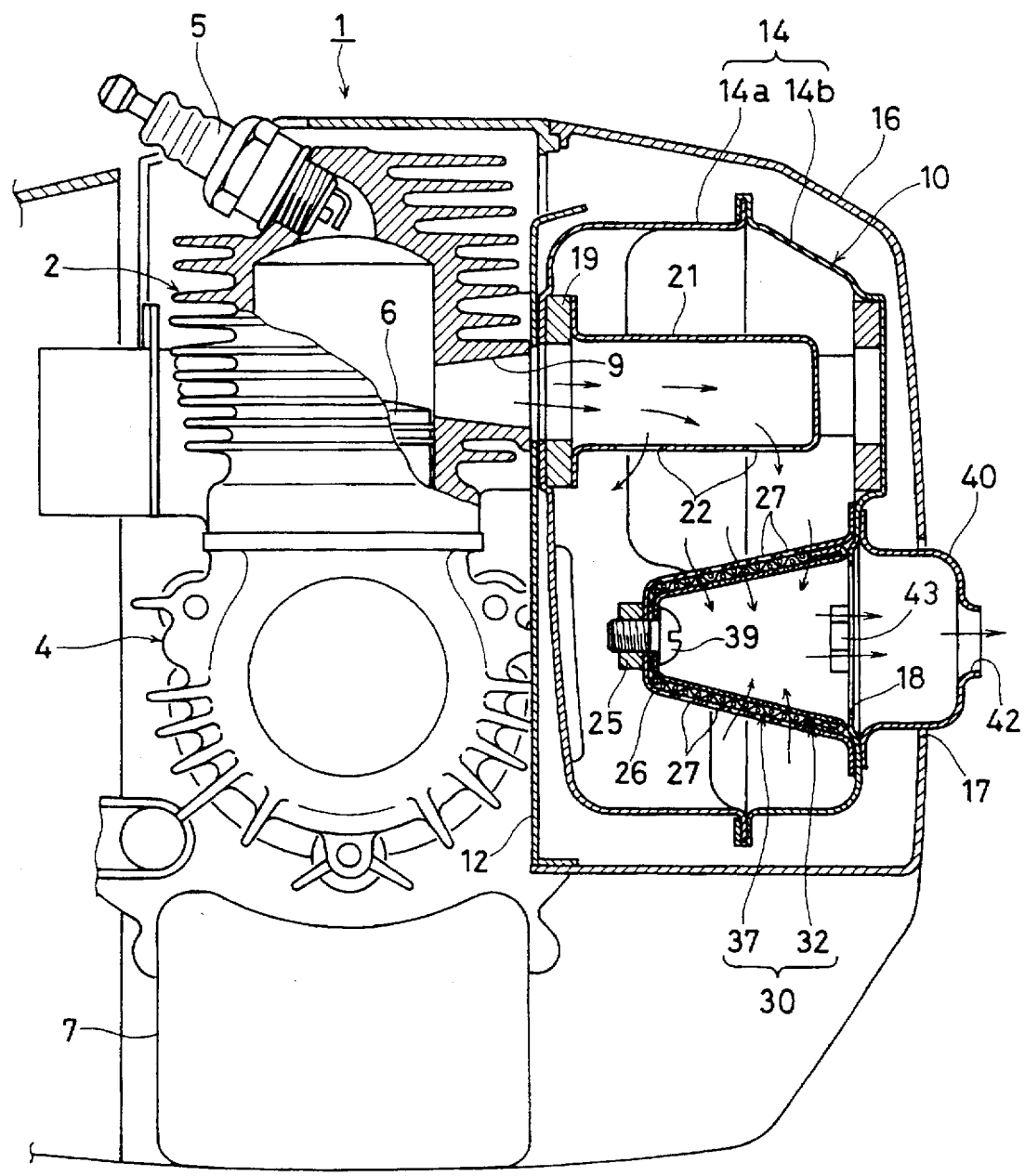
FIG. 1 is a vertical sectional view showing an embodiment of the muffler structure according to the present invention in conjunction with an internal combustion engine.

FIG. 1 shows one embodiment of the muffler structure for an internal combustion engine according to the present invention. In the illustrated embodiment, an internal combustion engine 1 is a small air-cooled two-cycle gasoline engine, which is incorporated as a power source into a portable small-sized working machine such as a brush cutter or a chain saw. The engine comprises a cylinder 2 provided with a sparking plug 5 at its top portion and having its side wall formed with an inlet port (not shown) and an exhaust port 9. A piston 6 is inserted in the cylinder 2, and a crank case 4 is connected to the bottom of the cylinder 2. Below the crank case 4, a fuel tank 7 is disposed.

A muffler 10 is sideways disposed on the cylinder 2 and the crank case 4 of the internal combustion engine 1 via a heat insulating plate 12. The muffler 10 has a muffler body 14 composed of two box-like sections 14a, 14b air-tightly unified with each other by, for example, seam joint technique. A muffler cover 16 is detachably mounted to externally cover the muffler body 14. In the muffler cover 16, an opening 17 is formed through which an exhaust pipe 40 that will be described below extends.

Figure 2:
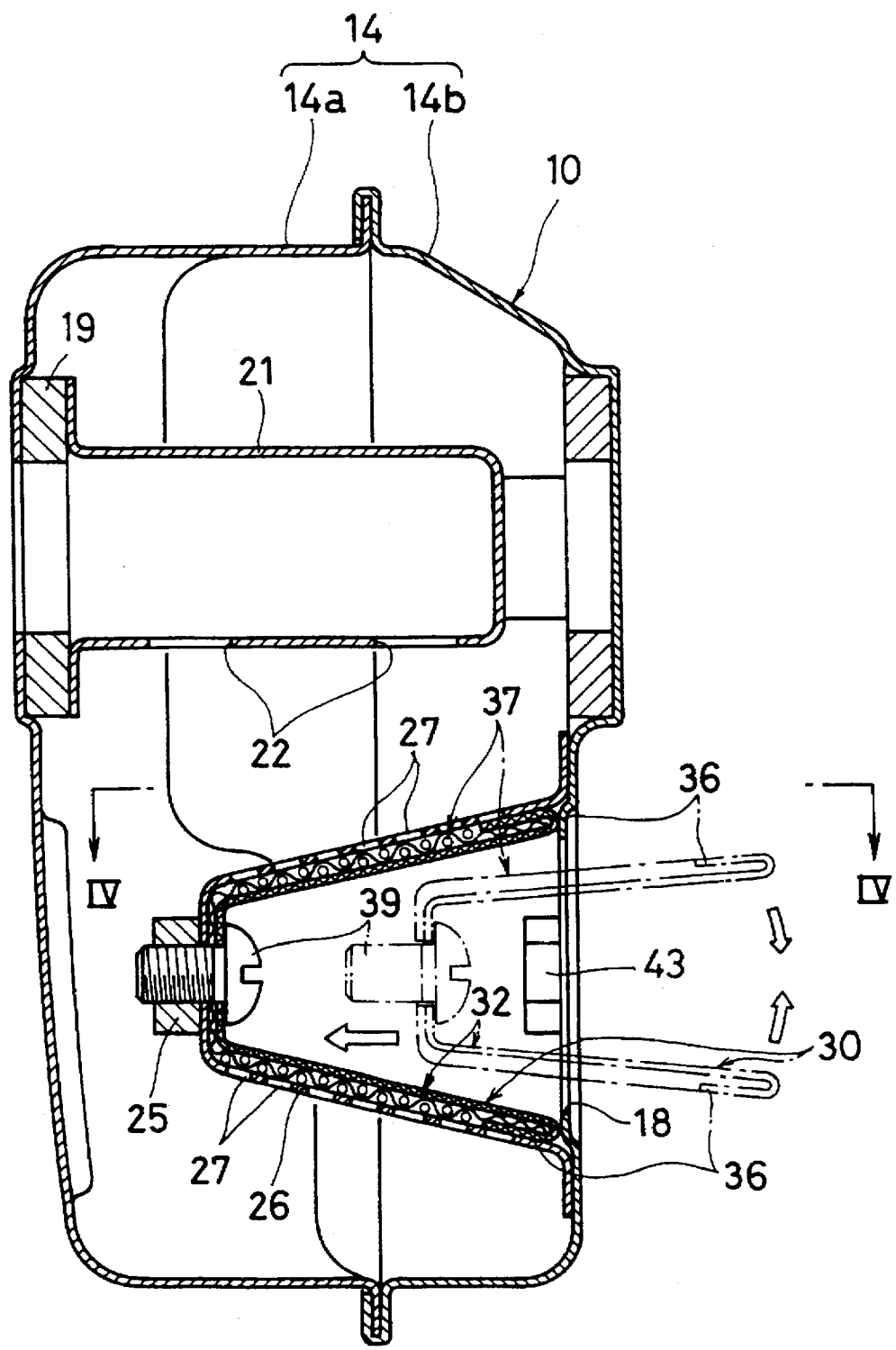
FIG. 2 is an enlarged vertical sectional view showing in detail the exhaust muffler shown in FIG. 1.

As well seen with reference to FIG. 2, in an upper portion of the muffler 10 (muffler body 14), a closed-end cylindrical exhaust gas introducing duct 21 is horizontally mounted on the muffler 10 (muffler body 14) via a reinforcing member 19 in alignment with the exhaust port 9. In a lower portion of the wall of the exhaust gas introducing duct 21, gas outlets 22 are formed.

Figure 4:
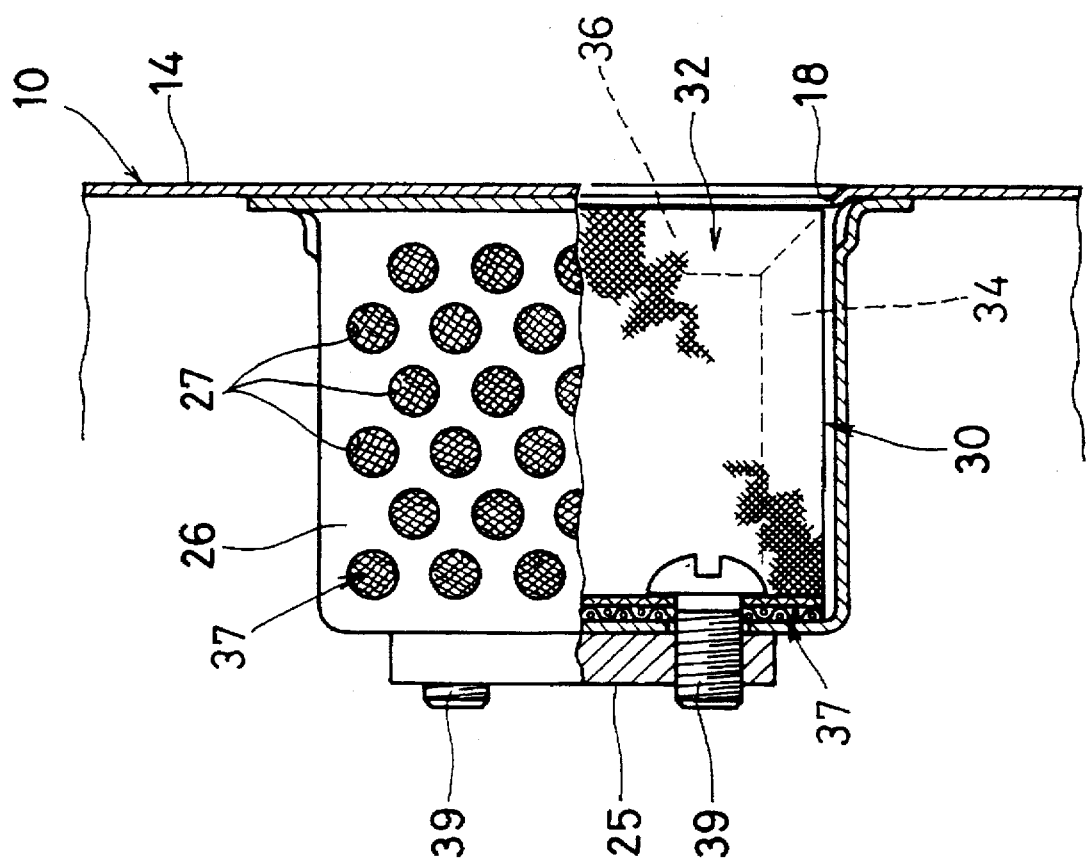
FIG. 4 is a partially cutaway fragmentary view taken along the line VI—VI and viewed in the direction of the arrows in FIG. 2.

In a lower portion of the muffler 10 (muffler body 14), a rectangular outlet opening 18 is formed. A truncated wedge-shaped mounting member 26 which is widened from its bottom toward its opening (which has a truncated V shape in section) is horizontally and internally applied and fixed, for example, by welding, at its opening to the periphery of the outlet opening 18 of the muffler 10 (muffler body 14) so as to cover the outlet opening 18. As well seen with reference to FIG. 4, the mounting member 26 has a number of vents 27, 27 . . . formed in its upper and lower walls. An exhaust gas introduced from the exhaust gas introducing duct 21 is discharged to the outside as a depolluted gas through the vents 27, 27 . . . of the mounting member 26, a catalytic assembly 30 which will be described below, the outlet opening 18 and an exhaust port 42 of the exhaust pipe 40 connected to the outlet opening 18 by screwing bolts (not shown) into fixing nuts 43, 43.

Onto the bottom (left end) of the mounting member 26, i.e., the innermost surface located deep in the muffler body 14, a mounting and reinforcing member 25 is fixedly attached.

Figure 3:
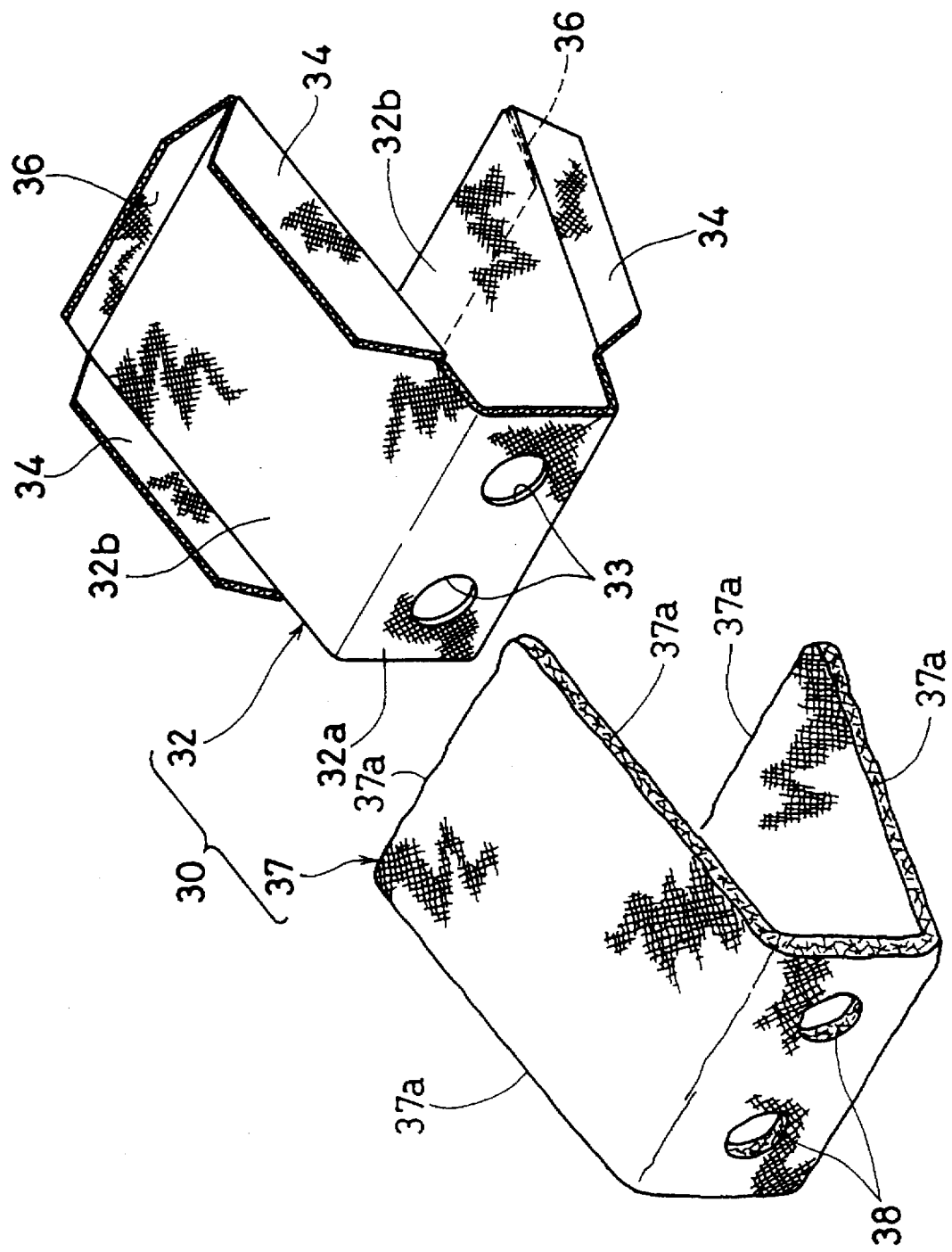
FIG. 3 is an exploded view of a catalytic assembly shown in FIG. 1.

Into the concavity of the mounting member 26, the catalytic assembly 30 is fitted. As well seen with reference to FIG. 3, the catalytic assembly 30 comprises a catalytic cloth 37 and an elastically flexible spark arresting wire mesh 32 each of which has a truncated V shape in section that is widened from its bottom toward its opening, like the mounting member 26. The catalytic cloth 37 is fitted over the spark arresting wire mesh 32 including a middle mounting portion 32a and a pair of slant plate portions 32b, 32b extending from the middle mounting portion 32a. In the catalytic cloth 37 and the middle mounting portion 32a of the spark arresting wire mesh 32, insertion holes 38 and 33 for inserting therein bolts 39 are formed, respectively.

Each slant plate portion 32b of the spark arresting wire mesh 32 are provided with side walls 34, 34, 36 which extend from respective three sides thereof. Accordingly, when the catalytic cloth 37 is fitted over the middle mounting portion 32a and upper and lower slant plate portions 32b, 32b of the spark arresting wire mesh 32, the peripheral edge 37a of the catalytic cloth 37 is covered with the side walls 34, 34, 36. The peripheral edge 37a of the catalytic cloth 37 is thereby protected from fraying by the side walls 34, 34, 36. At the same time, the catalytic cloth 37 is fixedly retained by the spark arresting wire mesh 32, thereby forming a unitary catalytic assembly 30.

When the catalytic assembly 30 is placed in the muffler 10 (muffler body 14), the exhaust pipe 40 is removed from the outlet opening 18. Then, the catalytic assembly 30 is inwardly deflected to narrow the opening end, as shown in phantom in FIG. 2. In this condition, the catalytic assembly 30 is inserted from the outlet opening 18 into the muffler 10. When the catalytic assembly 30 is entirely inserted into the muffler 10, a hand (the deflective force) is released therefrom.

Consequently, as shown by the solid lines in FIG. 2, the opening end of the catalytic assembly 30 is expanded by elasticity of the spark arresting wire mesh 32, and the entirety of the catalytic assembly 30 is elastically pressed against the inner wall of the mounting member 26, and the opening end (right end) is brought in abutment upon the inner peripheral edge of the outlet opening 18. In this condition, the catalytic assembly 30 and the mounting member 26 are clamped together by screwing the bolts 39, 39 into the mounting and reinforcing member 25.

When the catalytic assembly 30 is removed, substantially converse procedure is performed. The bolts 39, 39 are unscrewed, and the spark arresting wire mesh 32 is, for example, hooked by a wire. Then, the catalytic assembly is deflected in such a direction that the opening end is narrowed, as shown in phantom in FIG. 2, and drawn out from the outlet opening 18.

According to the muffler structure for an internal combustion engine of this embodiment which is constructed as described above, the peripheral edge 37a of the catalytic cloth 37 is protected by the side walls 34, 34, 36 provided on the spark arresting wire mesh 32, thereby diminishing occurrence of fraying and lowering of exhaust gas cleaning performance and durability. Further, the catalytic cloth 37 has a truncated V shape in section to ensure a large exhaust gas permeation area, thereby realizing enhanced cleaning performance.

It is to be noted that as means for retaining the catalytic cloth 37 and for preventing fraying, the spark arresting wire mesh 32 is used which is prepared only by providing a spark arresting wire mesh of a type customarily employed in a muffler with side walls 34, 34, 36, and no other member is required therefor. This is economically advantageous.

Further, the catalytic assembly 30 is located in the vicinity of the outlet opening 18 where a temperature is relatively low in the muffler 10, thereby further retarding lowering of exhaust gas cleaning performance and durability. Moreover, since the catalytic assembly 30 can be passed through the outlet opening 18 of the muffler 10 by utilizing the elastic deflection, attachment/ detachment of the catalytic assembly can be performed from the outside of the muffler. Accordingly, replacement of the catalytic cloth can readily be carried out, thereby realizing minimized maintenance cost.

In the foregoing, one embodiment of the present invention has been described in detail. It is, however, to be understood that the present invention is by no means restricted to the above-described embodiment and that various modifications may be made within the scope which does not depart from the spirit of the present invention as defined in the claims.

For example, in the above embodiment, the catalytic assembly 30 (the catalytic cloth 37 and the spark arresting wire mesh 32) has a substantially truncated V shape. However, the shape is not restricted thereto, and the catalytic assembly may have various shapes. Of course, the catalytic assembly may have a planar shape.

As understood from the above description, according to the muffler structure for an internal combustion engine of the present invention, the peripheral edge of the catalytic cloth placed in the muffler is protected by the side walls provided on the spark arresting wire mesh, thereby diminishing occurrence of fraying and lowering of exhaust gas cleaning performance and durability. Further, since the catalytic assembly is adapted to be capable of being passed through the outlet opening of the muffler, attachment/ detachment of the catalytic assembly can be performed from the outside of the muffler. Accordingly, there are attained excellent effects that replacement of the catalytic cloth can readily be carried out, and hence, maintenance cost is minimized.

What is claimed is:

1. A muffler structure for an internal combustion engine comprising:

a muffler, and a catalytic assembly disposed in said muffler, said catalytic assembly including a spark arresting wire mesh and a catalytic cloth fitted over said spark arresting wire mesh, said catalytic cloth has its peripheral edge covered entirely or in substantial part and retained with side walls peripherally provided on said wire mesh.

2. The muffler structure for an internal combustion engine according to claim 1, wherein said catalytic assembly is substantially U- or truncated V-shaped in section and placed in such a condition that its opening end adjoins an outlet opening of said muffler.

3. The muffler structure for an internal combustion engine according to claim 1 wherein said catalytic assembly is adapted to be capable of being passed through said outlet opening of said muffler.

4. The muffler structure for an internal combustion engine according to claim 2, wherein said catalytic assembly is adapted to be capable of being passed through said outlet opening of said muffler.

* * * * *